Aug. 30, 1932.    J. P. FRANK    1,874,272
CASH REGISTER
Original Filed Jan. 28, 1926    5 Sheets-Sheet 1

FIG. 1

Inventor
John P. Frank
By
*Earl Beust*

His Attorney

Aug. 30, 1932. J. P. FRANK 1,874,272
CASH REGISTER
Original Filed Jan. 28, 1926 5 Sheets-Sheet 2

Inventor
John P. Frank
By
His Attorney

Aug. 30, 1932.        J. P. FRANK        1,874,272
CASH REGISTER
Original Filed Jan. 28, 1926    5 Sheets-Sheet 4

Inventor
John P. Frank
By Carl Benst
His Attorney

Patented Aug. 30, 1932

1,874,272

UNITED STATES PATENT OFFICE

JOHN P. FRANK, OF DAYTON, OHIO, ASSIGNOR TO THE NATIONAL CASH REGISTER COMPANY, OF DAYTON, OHIO, A CORPORATION OF MARYLAND

CASH REGISTER

Original application filed January 28, 1926, Serial No. 84,350. Divided and this application filed March 11, 1930. Serial No. 434,911.

This invention relates to cash registers and like machines, and more particularly relates to key-operated cash registers of the type disclosed in Letters Patent of the United States, No. 1,785,378, issued on December 16, 1930, to John P. Frank, and of which the present application is a division.

It is an object of this invention to provide a machine of the type disclosed in the above referred to application, with novel mechanism to lock the amount keys in undepressed position until a transaction key is operated, and then to lock the depressed transaction key in operated position until an amount key is operated.

Another object of this invention is to provide a machine of the type mentioned, with a novel latch mechanism whereby two operating members operated independently in one direction are latched together to operate simultaneously in the other direction.

With these and incidental objects in view, the invention includes certain novel features of construction and combination of parts, the essential elements of which are set forth in appended claims, and a preferred form or embodiment of which is hereinafter described with reference to the drawings which accompany and form a part of this specification.

General description

Described in general terms, the machine of the parent patent includes a plurality of groups of amount keys, various transaction keys, a "read" key and a "reset" key. A plurality of totalizers is provided, one for each classification of transactions. These totalizers are operated by differential mechanism common to all of the totalizers, and under the control of manipulative means, which in this case are the amount keys.

The differential mechanism also provides convenient means for adjusting the type wheels to print on record material, the amounts entered in the various transaction totalizers, and to print the totals accumulated on these totalizers.

The differential mechanism also adjusts the indicating mechanism to indicate the amount of each item as it is recorded, and the totals accumulated on the various transaction totalizers on total and sub-total operations.

The printing mechanism includes a single type line having type wheels equal in number to the number of totalizer wheels in a single totalizer. This line also includes a type wheel having characters thereon representing the various transactions, and a type wheel operated by the "read" key and the "reset" key and having characters thereon indicating when a total or sub-total has been taken from a totalizer. Only the tubes for adjusting the type wheels are shown herein, inasmuch as the printing mechanism forms no part of this invention.

A plurality of counting devices provides means for counting the number of times the machine has been operated to enter the various transactions into the machine.

Detail description

Figure 4:
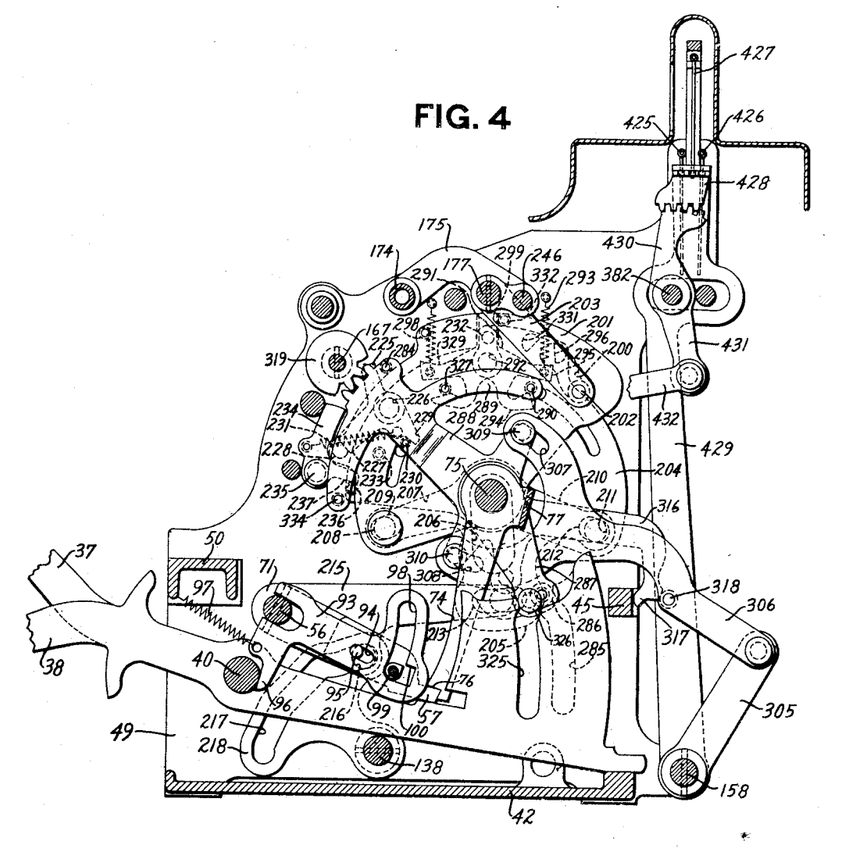
Fig. 4 is a transverse sectional view illustrating, in right elevation, the "read" and "reset" keys and the totalizer engaging controlling mechanism operated thereby.
Figure 5:
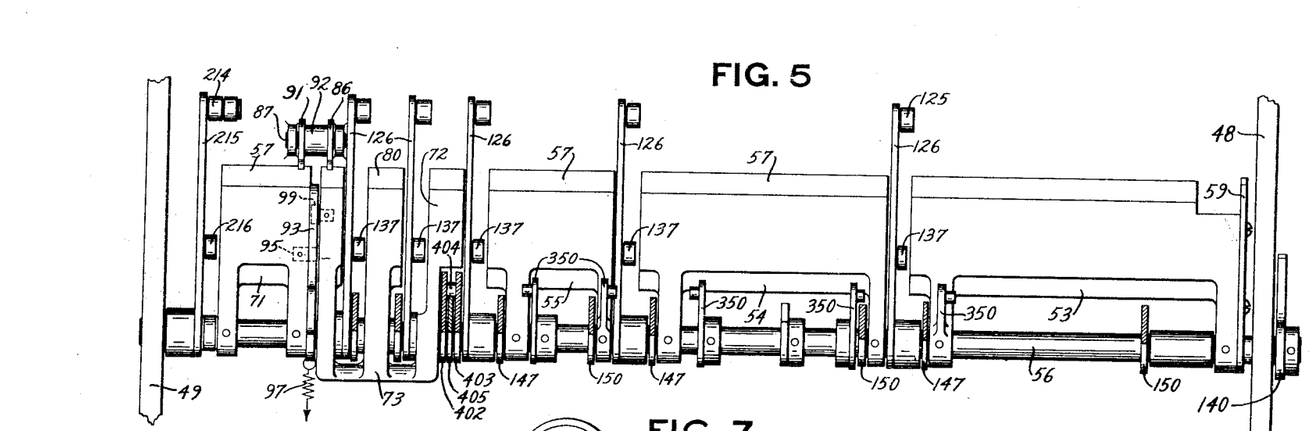
Fig. 5 is a top plan view of the key couplers and a part of the differential drive mechanism.

The keyboard includes groups of amount keys 35 (Fig. 1), a group of transaction keys 36 (Fig. 2), a "read" key 37 and a "reset" key 38 (Fig. 4). These keys are all pivoted on a cross rod 40 supported in a right side frame 48 (Fig. 5) of the machine and in a left side frame 49 (Figs. 1, 2, 4, 5 and 6). The rear ends 41 of the keys normally rest on a base 42 joining the frames 48 and 49 at their lower edges. The forward ends of the keys project through vertical slots in a cabinet 43 encasing the entire machine and the rear ends 41 of the keys project through vertical slots in a guide plate 44 secured to a cross bar 45 supported by the side frames 48 and 49 and to the base 42. These slots serve to guide the keys as they are operated and to laterally space them apart on the cross rods 40.

The enlarged rear arms of the amount keys 35 are provided with differential cam slots 47 to operate the totalizers, set the printing wheels and indicating mechanism. The differential cam slots of the keys of each group cooperate with a differential mechanism to be described later.

Key-operated machines, of the press-down key type, usually include a key coupler cooperating with all of the keys. In the invention shown herein the key coupler includes a plurality of individual couplers, 53, 54, 55 and 71 secured to a coupler shaft 56, journaled in the side frames 48 and 49 of the machine, and one coupler 72 pivoted on the shaft 56 to allow independent movement thereof. The key couplers 53, 54 and 55 (Fig. 5) secured to the shaft 56, cooperate with the groups of amount keys 35. Each of these key couplers terminates at its rear end in a lip or bar 57 (Fig. 1) normally resting on the rear arms of the key levers and being adapted, upon depression of a key or keys, to enter slots 58 in the enlarged rear end thereof to couple the depressed keys together.

The key coupler 71 (Figs. 3 and 5) is also secured to the shaft 56 and is operated by the "read" and "reset" keys, which keys are never operated simultaneously with the amount keys, but either the "read" or the "reset" key is operated with one of the transaction keys, as will be hereinafter described.

The key coupler 72 (Figs. 2, 3 and 5), comprising three arms joined by a yoke 73 is pivoted on the coupler shaft 56 and is operated by the transaction keys 36.

The amount keys 35, the "read" key 37 and the "reset" key 38 are locked against operation until one of the transaction keys 36 is depressed. This locking means includes an arm 74 (Figs. 2 and 4) pivoted on a shaft 75 journaled in the machine side frames 48 and 49 and having a shoulder 76 on its lower end normally resting in the path of the lip 57 on the key coupler 71. A yoke 77 connects the arm 74, to a companion arm 78 also pivoted on the shaft 75 and having its forward lower edge curved as at 79 (Fig. 2), along which curved edge a lip 80 on the key coupler 72 wipes upon depression of a transaction key 36 to rock the yoked arms 78 and 74 counterclockwise to remove the shoulder 76 on the arm 74 from above the lip 57 on the key coupler 71 (Fig. 4) thus permitting depression of an amount key 35, the "read" key 37 or the "reset" key 38.

The particular transaction key 36 depressed prior to the depression of an amount key 35, or the "read" key 37 or the "reset" key 38 is retained in its depressed position until an amount key 35, or the "read" key 37 or the "reset" key 38 is fully depressed, by latching the key coupler 72 associated with the transaction keys 36 in its elevated position. This latching device includes an arm 86 (Fig. 2) pivoted on a rod 87 supported in a pair of ears projecting upwardly from the machine base 42, the arm 88 being connected to an arm 91 by a hub 92. A spring 88 normally restrains the arms 86 and 91 in their home position with a foot 89 on the arm 86 resting on the machine base 42.

Figure 2:
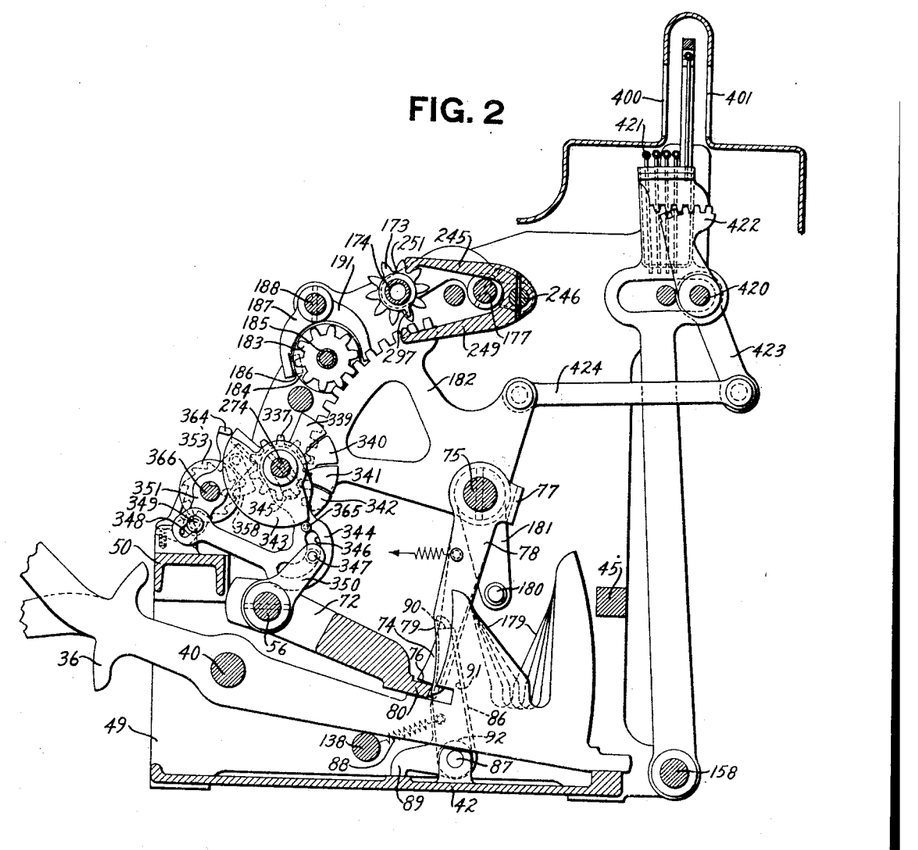
Fig. 2 is a transverse section view showing, in right elevation, the transaction keys and differentials associated therewith.

As the key coupler 72 swings upwardly, under the influence of the depressed transaction key 36, the lip 80 on the rear end thereof rocks the arm 86 clockwise until it passes above the upper end 90 of the arm 86, whereupon the spring 88 restores the arm 86 to its normal position, with the end 90 under the lip 80 of the key coupler 72. In this position the key coupler rests upon the arm 86 and is thereby held in its operated position.

Depression of an amount key 35; or the "read" key 37, or the "reset" key 38, rocks the arm 86 clockwise to allow the key coupler 72 to return to its normal position simultaneously with the other key coupler. The key coupler 72 is released from the arm 86 by the lip 57 on the key coupler 71, at its upward movement, engaging the arm 91 thus rocking the arms 86 and 91 clockwise to remove the end 90 of the arm 86 from beneath the lip 80 of the key coupler 72 whereupon the weight of the key couplers restores them to their normal position as soon as pressure is removed from the depressed keys.

The key coupler 72 is pivotally supported on the shaft 56 and is moved upwardly before the key couplers 53, 54, 55 and 71 are moved upwardly. It is a feature of this invention to latch the key couplers together so that they are all returned to their normal positions simultaneously.

This is accomplished by a latch 93 (Figs. 3, 4 and 5) interjacent the key couplers 71 and 72. The forward end of the latch 93 is bifurcated to embrace and slide upon the shaft 56. A slot 94 in the latch 93 surrounds a pin 95 projecting laterally from the key coupler 71, thus permitting reciprocating movement of the latch 93, which is normally restrained in the position in which it appears in Figs. 3 and 4 by a spring 97 which holds a depending projection 96 in contact with the rod 40 upon which the keys are pivoted. A pin 99, projecting laterally from the lefthand arm of the key coupler 72, as viewed in Fig. 5, projects into a curved slot 98 formed in the righthand end, as viewed in Figs. 3 and 4, of the latch 93.

Depression of the transaction key 36 rocks its key coupler 72 counter-clockwise (Fig. 3), carrying the pin 99 upwardly in the slot 98. As the key coupler 72 arrives at its uppermost position, it is locked in its operated position by the arm 86, as described above. An amount key 35, the "read" key 37 or the "reset" key 38 is now depressed, rocking the key coupler 71 counter-clockwise, which by the stud 95 projecting into the slot 94 in the latch 93 carries the latch counter-clockwise therewith.

Figure 3:
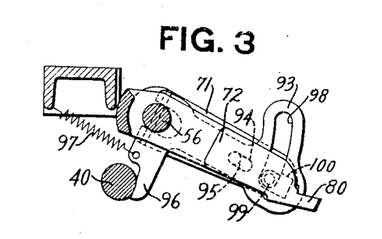
Fig. 3 is a detail view of the device for latching the key couplers together after a transaction key and another key are depressed.

As soon as this counter-clockwise movement of the key coupler 71 and the latch 93 commences, the projection 96 moves away from the rod 40 to permit the spring 97 to press the right-hand wall of the slot 98 in the latch 93 against the pin 99 projecting from the key coupler 72.

As the key coupler 71 and latch 93 arrive at their uppermost position, an offset 100 in the lower end of the slot 98 permits the spring 97 to draw the latch 93 toward the shaft 56 engaging the offset 100 with the pin 99 thus coupling the key coupler 71 to the key coupler 72.

Now as the key couplers 53, 54 and 55 associated with the amount keys 35 and the key couplers 71 associated with the "read" key 37 and the "reset" key 38 return to their normal position upon release of pressure from the depressed keys, the key coupler 72 is rocked positively therewith due to the coupling just described.

As these key couplers approach their normal positions the downwardly projecting arm 96 on the latch 93 strikes the rod 40 and continued movement of the key couplers to normal position shoves the latch 93 toward the right, as viewed in Figs. 3 and 4, to disengage the offset shoulder 100 from the pin 99 against the tension of the spring 97.

*Differential mechanism*

The differential mechanism operated by depression of the amount keys 35 actuates the totalizer wheels to add amounts thereon, positions the type wheels, and selects the indicators.

The side walls of the differential cam slot 47 in the enlarged rear end of the depressed key 35 (Fig. 1) engages a roller 106 freely mounted on a rod 107 supported between a pair of arms 108 extending downwardly from a sleeve 109 surrounding the shaft 75. A sleeve 109 and a pair of downwardly projecting arms 108 are provided for each denominational group of amount keys 35. A stud 111 projecting from an arm 110, integral with one of the arms 108, projects across the plane of a segmental gear, or totalizer actuator, 112.

Figure 1:
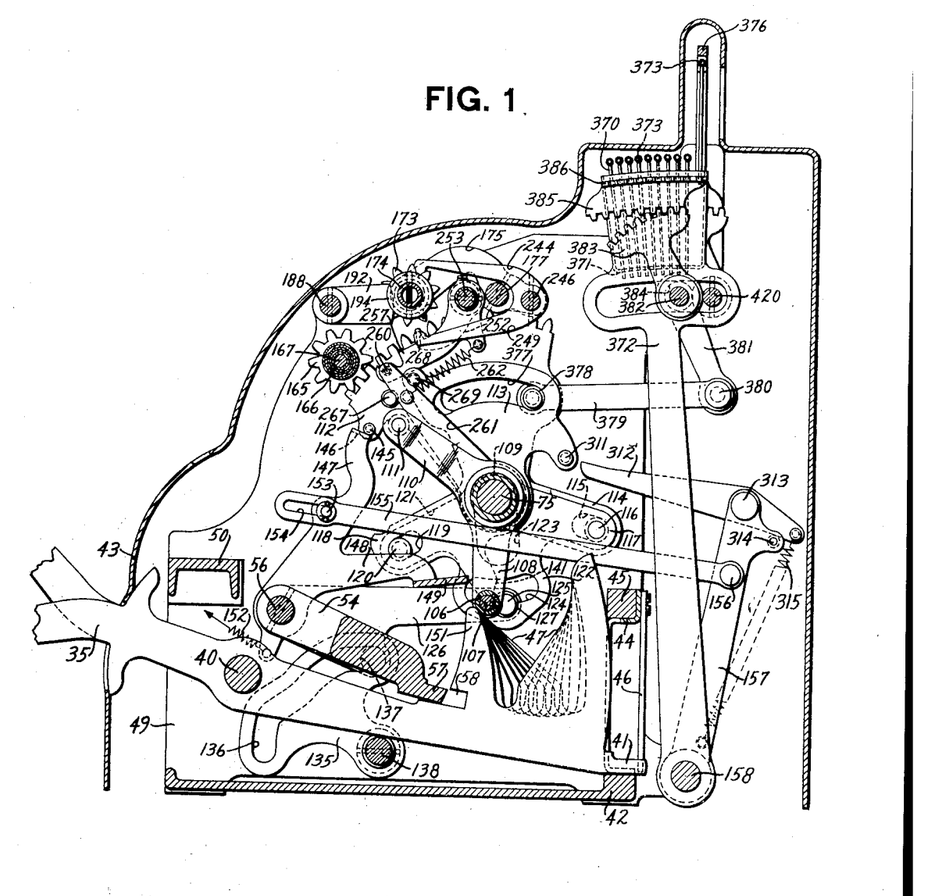
Fig. 1 is a transverse sectional view in right elevation of the tens of cents keys and the differential mechanism associated therewith.

Depression of one of the amount keys 35 for a particular group engages its differential cam slot 47 with the roller 106 to differentially rock the lever 110 counter-clockwise to position the stud 111 according to the particular amount key depressed. This differential setting of the arm 110 and the stud 111 controls the extent of movement of the totalizer actuator segment 112. The totalizer actuator segment 112, is pivoted on the shaft 75 together with a companion lever 113 having an arm 118. The segmental gear 112 and the arm 118 move in opposite directions toward each other during their operation until each is stopped by contacting the differentially positioned stud 111 on the differentially adjustable arm 110.

A slot 115 in an arm 114 of the actuator segment 112 surrounds a pin 116 carried by an arm 117 rigid with an operating plate 122 having a substantially vertical slot 123, so that the plate 122 surrounds the shaft 75 and may be moved vertically relative thereto. The arm 118 of the lever 113 has a slot 119 surrounding a pin 120 carried by an arm 121 also rigid with the operating plate 122.

From the connection just described, it is clear that when the operating plate 122 is moved upwardly, by means to be hereinafter described, the arm 117 of the plate 122 through the pin and slot connection 116 and 115 and the arm 114 of the segment 112 rocks the segment 112 counter-clockwise. Simultaneously with this counter-clockwise movement of the segment 112, the arm 121 of the operating plate 122 through the pin and slot connection 120 and 119 drives the arm 118 of the lever 113 clockwise. These two movements continue until either the arm 118 or the segment 112 contacts the differentially positioned stud 111.

When either the gear segment 112 or the arm 118 of the plate 113 is arrested, the other one of the two continues its movement until it is also arrested by the stud 111.

The operating plate 122 has a curved slot 124 embracing a roller 125 on an arm 126 pivoted on the shaft 56. The roller 125 normally rests in a recess 127 in the bottom of the slot 124. An operating plate 122 and an arm 126 are provided for each of the denominational groups of keys.

The arms 126 are each oscillated by one of a series of cam levers 135 (Fig. 1) having cam slots 136 embracing rollers 137 on the arms 126, the configuration of the cam slots being such that the arms 126 are successively rocked. The cam levers 135 give the arms 126 a fixed extent of movement during each operation of the machine, and the arms 126, in turn, give the operating plate 122 a fixed sliding movement during each operation of the machine.

Figure 7:
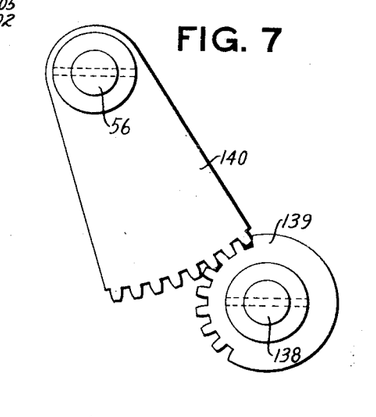
Fig. 7 is a detail view of the differential actuator cam shaft drive.

The cam levers 135 are all secured to a shaft 138 supported at each end in the machine side frames 48 and 49. Also secured to the shaft 138 outside of the right-hand side frame 48 of the machine is a partial gear 139 (Fig. 7) meshing with a segment 140 secured to the key coupler shaft 56. As the key coupler operates, the shaft 138 is oscillated by the segment 140 and partial gear 139, and consequently, the cam levers 135 are oscillated to rock the arms 126 first counter-clockwise and then clockwise to their normal positions. As the arms 126 move counter-clockwise their rollers engage the upper walls of the slots 124 and move the operating plates 122 upwardly to rock the gear segments 112 and the levers 113, as previously described.

As the operating plate 122 is raised to rotate the gear segment 112 and lever 113, this plate 122, due to its connection with the segment gear 112 and the arm 118 of the lever 113, also rotates. The slots 115 and 119, however, are of sufficient length to provide for the relative sliding and rocking movement of the driving plate 122, gear segment 112, and lever 113.

Assuming now that the "9" amount key has been depressed, and referring particularly to Fig. 1. This figure shows the parts in their normal positions. During an operation with the "9" key depressed, the differential slot 47 in the "9" key lever rocks the differential arm 110 and its stud 111 nine steps counter-clockwise from the position shown in Fig. 1.

As the arm 126 rocks counter-clockwise, the roller 125, by its contact with a toe 141 of the arm 118 rocks said arm clockwise until the roller 125 strikes the upper wall of the slot 124 of the operating plate 122. Continued upward movement of the roller 125 now raises the operating plate 122, and continues to rock the arm 118 clockwise until the arm is stopped by the stud 111 which has been moved to the "9" position. During this time, the segment 112 and arm 114 have been slightly rocked in a counter-clockwise direction through the pin 115 and arm 114.

Now as the arm 118 has been stopped by the stud 111, the continued pressure of the roller 125 against the upper wall of the slot 144 continues to slide the operating plate 122 upwardly, and at the same time rocks the plate counter-clockwise with the pin 120 as a fulcrum, and the pin 116 rocks the arm 114 and segment 112 counter-clockwise until the latter contacts the stud 111.

The extra movement of the arm 118 by the roller 125 contacting the toe 141, moves a stud 269 on the lever 113 away from the arm 261, in connection with the transfer mechanism. During this movement the operating plate 122 is rocked counter-clockwise until the roller 125 assumes a position near the left end of the slot 124.

While the segment 112 is in this position the selected totalizer, in a manner to be hereinafter described, is rocked into engagement with the differentially positioned actuator segment 112. After this engagement has been effected, the arm 126 by its cam lever 135, is moved clockwise to its normal position. During this restoring movement the roller 125 strikes the bottom wall of the slot 124 of the operating plate 122, thus sliding the plate downwardly and at the same time rocking it clockwise to its home position, thus rocking the actuating segment 112 clockwise and adding "9" into the totalizer pinion, which amount is equal to the nine steps of movement given the segment at this time. After the segment 112 has been restored to its normal position, the latter part of the movement of the arm 126 and roller 125 through the operating plate 122, restores the arm 118 and its lever 113 counter-clockwise to their home positions.

The clockwise movement of the segment 112 is limited by a pin 267 carried thereby, contacting a control arm 261 normally in the position shown in Fig. 1. The arm 261 is controlled by transfer mechanism, but, when no transfer has taken place, the arm 261 remains locked in the position shown in Fig. 1 thus positively limiting the clockwise movement of the actuating segment 112.

Clockwise movement of the arm 126 to its normal position, through the roller 125 and the operating plate 122, rocks the arm 118 and the lever 113 counter-clockwise to their home positions, in which they appear in Fig 1.

From the above description it can be seen that the operating plate 122 has a fixed vertical reciprocatory movement, and a variable oscillatory movement determined by the value of the key 35 depressed.

Referring again to Fig. 1, it may be seen that the segment 112 is normally locked against movement unless a key 35 related to that particular segment is operated. This locking means includes a pin 145 projecting from the segment 112 and engaging a flange 146 formed on the arm 147 pivoted on the shaft 56. The arm 147 has a rearwardly extending arm 148 connected by a yoke 149 to a companion arm 150 also pivoted on the shaft 56.

When an amount key 35 is depressed a projection 151 on the enlarged rear arm of the key engages the yoke 149 and rocks the arm 147 counter-clockwise carrying the flange 146 out of the path of the pin 145, to free the segment 112. If, however, no key is depressed in a particular group, the flange 146 on the arm 147 restrains the segment 112 in its home position. The lever 113 associated with the particular group of amount keys, in this case, moves its full ten steps, as hereinbefore described.

As the depressed amount key returns to its home position, a spring 152, having one of its ends attached to a projection on the arm 147, returns this arm to its home position. When the arm 147 is in its home position, a pin 153 mounted thereon is in contact with the right-hand end of a slot 154 formed in the left-hand end of a link 155 having its right-hand end pivoted on a stud 156 projecting from an arm 157 secured to a shaft 158 supported in the frames of the machine. The link 155 functions in connection with the "read" and "reset" operations of the machine, which, will be described later.

Totalizer selection

The machine, as illustrated in the parent patent is provided with four transaction totalizers, one for each classification, known herein as "cash", "received-on-account", "charge" and "paid-out". Each totalizer includes five denominational elements 173 and since there are three banks of keys, the three lower denominational elements receive the entries direct from the differential segments 112 and the two higher denominational elements 173 are used for overflow amounts.

The elements of each denomination are arranged in groups, the first group includes the four "cents" elements; the second group includes the four "dimes" elements; the third group includes the four "dollars" elements; the fourth group includes the four "tens of dollars" elements; and the fifth group includes the "hundreds of dollars" elements; as is common in interspersed totalizers of the type shown and described in the patent to F. L. Fuller, No. 1,242,170, thus making five groups of denominational elements having four elements in each group, which are shifted laterally to select the totalizer, after a manner well known in the art.

The totalizer wheels 173 are rotatably mounted on a hollow shaft 174 supported near its ends by an arm 175 and another arm (not shown herein), secured to a shaft 177 supported at its ends in the frames 48 and 49 of the machine. Each group of wheels is maintained in its relative lateral position on the shaft 174 by collars (not shown) secured to the shaft, one at each side of each group of wheels. The shaft 174, together with its various groups of totalizer wheels is moved laterally to position the appropriate totalizer wheel in the plane of the actuating segments 112.

The totalizers are shifted under the control of the five transaction keys 36, provided with differential cam slots 179 adapted to engage rollers 180 mounted on five separate arms 181, only one being shown herein, secured to the shaft 75.

Depression of a transaction key 36 engages its differential cam slot 179 with the roller 180 on the particular arm 181 associated therewith, thereby differentially setting the arm 181, shaft 175 and a segment 182, also fast on the shaft 75, according to the particular transaction key 36 depressed. The segment 182 is constantly in mesh with a pinion 183 secured to a drum cam 184 fast to one end of a sleeve 185. The opposite end of the sleeve 185 has a suitable type wheel secured thereto which is likewise differentially set according to the particular transaction key depressed.

A stud 186 (Fig. 2) on an arm 187 of a forked lever fast on a shaft 188, projects into a cam groove (not shown) in the circumferential periphery of the drum cam 184. It will be seen by examination of Fig. 2 that the arm 191 of the forked lever closely follows the periphery of the drum cam, it being the purpose of this arm to prevent rocking movement of the shaft 188.

An arm 192 (Fig. 1) fast on the shaft 188 projects into an annular groove in a collar 194 secured to the shaft 174. When, upon depression of a key 36, the segment 182 is differentially rotated according to the particular key depressed and the gear 183 and drum cam 184 are correspondingly rotated, the shaft 188 is shifted laterally of the machine and, by the arm 192 and collar 194, shifts the totalizer shaft 174 also transversely of the machine to select the particular totalizer corresponding to the transaction key 36 depressed.

Totalizer engaging

After the totalizer is thus selected, the shaft 177, upon which the totalizer arm 175 and its companion arm (not shown) are secured, is rocked counter-clockwise to engage the totalizer wheels with the actuator segments 112.

A stud 202 (Fig. 4) on an arm 203, fast on the totalizer engaging shaft 177, projects into a cam slot 200 in a totalizer engaging plate 201 pivotally mounted on the shaft 75. At the proper time during the operation of the machine, the totalizer engaging plate 201 is rocked clockwise to, by the stud 202 and cam slot 200, rock the totalizer shaft 177 first counter-clockwise to engage the totalizer wheels with the actuator segments 112 and then later in the operation the totalizer engaging plate 201 is rocked counter-clockwise to normal position to disengage the totalizer wheels from the actuator segments. A plate 204, also pivoted on the shaft 75, and associated with the plate 201, rocks first counter-clockwise, and then clockwise. A driver 205 having an elongated opening 206 therein, surrounding the shaft 75, is located interjacent the plates 201 and 204. A roller 208 on an arm 207 of the driver 205 projects into a slot 209 in the plate 201. Likewise, a roller 211 on an arm 210 of the driver 205 projects into an opening 212 in the plate 204. A curved slot 213 in the lower part of the driver 205 embraces a roller on the free end of an arm 215 pivoted on the shaft 56. A cam slot 217 in a cam lever 218 fast on the shaft 138, embraces a roller 216 projecting from the arm 215.

As the shaft 138 oscillates as above described, the cam arm 218 rocks first clockwise, and then counter-clockwise to normal position, and the cam 217, acting on the stud 216, rocks the arm 215, first counter-clockwise, and then clockwise, to normal position. The arm 215, by the pin and slot connection 213 and 214, first raises the driver 205 and then lowers it to normal position. As the driver 205 moves upwardly, the arm 207, through the stud 208 and slot 209, rocks the totalizer engaging plate 201 clockwise to engage the totalizer. At the same time the stud 211, on the arm 210 of the driver 205, rocks the plate 204 counter-clockwise.

However, at an operation of the machine in which an amount is added into the totalizer, the plate 201 is held against movement until near the end of the downward movement of the key lever, when it is released and permitted to rock clockwise. It is during this clockwise rotation that the cam slot 200 and its associated parts, rock the totalizer into engagement with the actuating segment 112.

A pawl 225, pivoted on a stud 226 supported in the frame of the machine, restrains the plate 201 against movement during the time stated above. An arm 227, on the pawl 225, normally rests in the path of a stud 228 projecting from the plate 201. A spring 231 normally holds another arm 229 of the pawl 225 against a pin 230 projecting from an arm 288 journaled on the shaft 75. As the plate 204 rocks counter-clockwise, a stud 298, projecting laterally therefrom, engages the arm 225 of the pawl and rocks the pawl counter-clockwise, removing the arm 227 from the path of the pin 228. The counter-clockwise movement of the pawl 225 is limited by a stud 233 projecting from the side frame 49 of the machine.

The arm 227 of the pawl, now being removed from the path of the stud 228, and further counter-clockwise rotation thereof blocked by the stud 233, arrests the counter-clockwise movement of the plate 204 and permits the plate 201 to move clockwise. At the same time, continued upward movement of the actuator 205 interjacent the plates 201 and 204 continues to rock the totalizer actuator plate 201 clockwise by the stud 208 and slot 209 to, by the cam slot 200 engaging the roller 202, rock the selected totalizer into engagement with the actuators.

As the plate 201 arrives at the limit of its clockwise movement, a spring-urged pawl 234 pivoted at 235 rocks clockwise a distance sufficient to place the upper end of the pawl in the plane of the stud 228, carried by the plate 201. The pawl 234, in this position, retains the plate 201 in its operated position, thereby holding the totalizer in engagement with the actuating segment 112 during the greater part of the return movement of the key levers.

Since the pawl 234 restrains the plate 201 against restoring movement during the time stated, it is evident that the plate 204 returns to its home position at the restoring movement of the actuators 205 before the plate 201. As the plate 204 approaches its home position on the restoring movement, a stud 236, projecting therefrom, engages an arm 237 of the pawl 234 and rocks this pawl counter-clockwise out of the path of the stud 228, thus releasing the plate 201 so that the actuator 205, on its final restoring movement quite near the end of the operation, rocks the totalizer engaging plate 201 clockwise to normal position, disengaging the totalizer from the actuator 112, as above described.

Suitable aliners 244 and 245 are provided to aline the totalizer wheels when the totalizers are out of engagement with the actuators, and during a part of the movement of the totalizer wheels into engagement with the actuator 112. Aliners 249 aline the elements not selected for engagement with the actuators, when the selected elements are engaged with the actuators, as pointed out in the parent patent.

Suitable transfer mechanism to carry one from the lower order totalizer wheels to the next higher order wheel when the wheel of lower order passes from "9" to "0" is provided, but, since this transfer mechanism forms no part of the present invention, a detailed description thereof is omitted from this divisional application.

Sub-total taking operations

The amounts standing on the various totalizers may at any time be set on the type wheels (not shown), printed, indicated, and then replaced on the totalizer, by operating the machine under the control of the "read" key 37.

To accomplish the sub-total taking operations it is necessary to engage the totalizers with the actuators and to disengage the totalizers from the actuators at different times than on adding operations. This is accomplished by holding the plate 204 and permitting the totalizer engaging plate 201 to rock clockwise at the beginning of the "read" operation.

When the "read" key 37 is depressed, a cam slot 285 in the enlarged rear end thereof engages a roller 286 on the lower end of an arm 287, pivoted on the shaft 75 and secured to an arm 288. As the slot 285 moves upwardly over the roller 286 it rocks the arm 287 and arm 288 slightly counter-clockwise due to the configuration of the cam slot 285.

A stud 290, carried on an arm 289 projecting rearwardly from the arm 288, projects through clearance slots in the plates 201 and 204 to engage a pawl 291 pivoted on a stud 292, supported in the left side frame 49 of the machine. A spring 293 normally holds a nose 294 of the pawl 291 in engagement with the stud 290, and, as the stud 290 moves toward the left with the arm 289, the spring 293 rocks the pawl 291 counter-clockwise about its pivot, positioning a shoulder 295 of the pawl 291 in the path of a stud 296, projecting laterally from the plate 204, to retain this plate in its normal position.

Since the plate 204 is thus retained in its normal position, movement of the driver 205 rocks the plate 201 clockwise to engage the totalizer with the actuating segments 112 at the beginning of the operation, and before the actuators are differentially positioned.

The totalizer engaging plate 201 is normally restrained against clockwise rotation by the arm 227 of the pawl 225, but when the plate 288 is rocked counter-clockwise by depression of the "read" key 37, a stud 284, carried in this plate, engages the pawl 225 and rocks it counter-clockwise about its pivot to remove the arm 227 from the path of the stud 228, thereby releasing the plate 201 for operation to engage the selected totalizer wheels 173 with the actuating segments 112, at the beginning of the operation of the machine.

After the selected totalizer elements 173 are engaged with the segment 112, the segments are rocked counter-clockwise under control of the totalizer wheels. Each totalizer wheel 173 has a cam 251 (Fig. 2), each having a toe 297, to engage a nose 268 (Fig. 1), on a transfer pawl 252 to stop rotation of the totalizer wheel 173 and segment 112 when the wheel reaches its zero position. During this movement of the segments 112, the type wheels (not shown) are positioned by pinions 165 and sleeves 166 to set up an amount corresponding to the amount standing on the totalizer. After the segment 112 is arrested by the totalizer element, the companion plate 113 is adjusted, as in adding operations, to adjust the indicators to indicate the amount taken from the totalizer.

To take a sub-total from the totalizer, it is first necessary to reset the selected totalizer to zero, and then, after having set the indicators and type wheels correspondingly, to restore the amounts to the totalizer wheels. The explanation just given, told how the selected totalizer is engaged with the actuators early in the operation to be turned backwardly to zero. Now, however, the plate 201 must be held in its moved position to hold the totalizers in engagement with the actuators until the amount is replaced on the totalizer wheel.

As the plate 201 reaches the limit of its clockwise movement, upon depression of the "read" key 37, a stud 298, on the plate 201, wipes against an upwardly extended finger 299 on the pawl 291, to rock said pawl clockwise to free the plate 204. Upon continued operation of the "read" key 37, the plate 204 starts to move counter-clockwise. As the plate 204 moves counter-clockwise, a stud 236 thereon moves away from the finger 237 of the pawl 234, whereupon the spring 227 moves the end of the pawl 234 beneath the stud 228, which, at that time, is in its extreme clockwise position, to temporarily maintain the plate 201 in its operated position. The clockwise movement of the plate 201, through the cam slot 200 therein, roller 202, and arm 203, rocks the selected totalizer into engagement with the actuators 112, and as long as the plate 201 is held in the moved position by the pawl 234, the totalizer remains in such engagement.

Return movement of the "read" key 37, and key coupler 57, through shaft 56 (Fig. 7), segment 140 and gear 139, returns the shaft 138, cam 218 (Fig. 4), towards the normal position, to lower the driver 205 to its normal position. Since the plate 201 is temporarily held against return movement by pawl 234, when the return movement of the driver starts, the plate 204 is rotated clockwise by stud 211, until the stud 236 strikes the finger 237 of the pawl 234 and withdraws the pawl from contact with the stud 228, to release the plate 201. At the end of the clockwise movement of the plate 204, the stud 296 is again in position to be latched by pawl 291, but at this time the stud 298 still holds the pawl 291 against the tension of the spring 293.

Continued movement of the driver 205 towards its normal position rotates the plate 201, now released, counter-clockwise and withdraws stud 298 from contact with the finger 299, to permit the pawl 291 to snap behind the stud 296, to again lock the plate 204. As the "read" key reaches its normal position, the cam slot 285 therein restores the arm 287 and plate 288 to their normal positions to withdraw the pawl 291 from contact with the stud 296 on plate 204, and to permit the pawl 227 to again engage the stud 228 on plate 201 preparatory to another operation of the machine.

Referring to Fig. 1, it will be seen that the actuating segments 112 are normally locked against operation by the arm 147, and when entering items in the totalizers this lock is removed by the operation of any amount keys as previously described.

In a "read" operation of the machine, the amount keys are not depressed, and therefore, other means are supplied to unlock the lock, so that the actuating segments may operate.

The link 155 (Fig. 1), which forms a connection between the arm 147 and the arm 157, secured to the shaft 158, moves the arm 147 counter-clockwise to release the actuating segments so that they may operate. The shaft 158 is oscillated by an arm 305 (Fig. 4) pinned to the shaft and connected at its upper end by a pitman 306 to the plate 288. The forward, or left-hand end of the pitman is bifurcated and has two elongated slots 307 and 308 engaging studs 309 and 310, respectively, mounted in the plate 288.

The shaft 158 serves a double purpose. In addition to releasing the actuating segment 112 for operation, it also causes a retarding action on the lever 113 (Fig. 1) so that the actuating segment 112 moves before the lever 113 and under the control of the totalizer. This retarding effect on the lever 113 is obtained by a pin 311 carried in the lever 113 and adapted to cooperate with a lever 312 pivoted at 313 on the arm 157. This lever 312, in normal position, is held in engagement with a pin 314 by a spring 315. As the shaft 158 rocks counter-clockwise, the lever 312 passes under the pin 311 so that, when the lever 113 tends to move clockwise, its pin 311, engaging the lever 312, increases the tension upon the spring 315 and retards the lever 113; but, as the actuating segment 112 is positively stopped by the transfer cam 251, previously described, the lever 113 is moved against the tension of the spring 315.

The shaft 158 (Fig. 4), is locked against operation, unless a "read" or "reset" key is depressed. This locking means consists of a rearwardly extending arm 316 on the plate 288 (Fig. 4), provided with an irregularly formed end 317 which engages a pin 318 mounted in the pitman 306. The moving of the plate 288 clockwise or counter-clockwise, by the "read" or "reset" key, destroys the locking condition between the end 317 of the arm 316 and the pin 318 carried by the pitman 306.

A character is set up on a type wheel (not shown) to indicate on the printed record that a "read" operation is performed. A partial gear 319, meshing with teeth formed on the plate 288, is fast upon the shaft 167, to actuate the shaft to adjust the type wheel secured to one end of the shaft.

*Totalizer resetting mechanism*

When it is desired to reset any one of the totalizers to zero, the necessary transaction key 36 is depressed to select the desired totalizer and then the "reset" key 38 is operated to take the total from the selected totalizer.

This is accomplished by engaging the totalizer at the beginning of the operation and disengaging said totalizer at the beginning of the restoring movement of the key.

A cam slot 325 (Fig. 4) in the enlarged rear arm of the "reset" key 38 embraces a roller 326 on the arm 287. As the "reset" key 38 is depressed, this slot 325, engaging the roller 326, rocks the arm 287 slightly clockwise. The arm 287, being secured to the arm 288, also rocks this latter arm slightly clockwise. The clockwise movement of the arm 288 carries the stud 290 on the curved arm 288, projecting from the arm 288, out of the path of the nose 294 of the pawl 291, permitting the spring 293 to position the nose 295 of the pawl 291 in the path of the stud 296 on the plate 204, thereby locking the plate 204 against counter-clockwise movement. At the same time the stud 230, on the arm 288, rocks the pawl 227 counter-clockwise and disengages the nose of this pawl from the path of the stud 228, thereby freeing the plate 201 for immediate clockwise rotation.

When the actuator 205 is moved upwardly by the arm 215, as above described, with the plate 204, thus retained, and the totalizer engaging plate 201 free for operation, the latter plate is rocked clockwise to engage the totalizer with the actuator 112 through slot 200 and arm 203. The actuators 112 are then actuated, as above described, under the control of the totalizer wheels themselves, to reset the totalizer wheels to zero, at the same time setting the amount taken therefrom on the type wheels and indicators.

Since it is desired to allow the totalizer wheels to stand in their zero positions, to which they were just restored, the engaging plate 201, at the beginning of the restoring movement of the "reset" key 38, is rocked counter-clockwise to disengage the totalizer from the actuators.

When the arm 288 is rocked clockwise at the beginning of the "reset" operation, a stud 327 is removed from the path of the nose of a pawl 329, permitting this pawl to swing clockwise about its pivot 292. Now, as the plate 204 is rocked counter-clockwise, a stud 331, projecting from the plate 204, wipes by the pawl 329, which pawl is then immediately rocked clockwise by its spring, to position the pawl in the path of the stud 331, thereby blocking restoring movement of the plate 204. With the plate 204 thus restrained against restoring movement, the downward movement of the actuator 205, at the beginning of the restoring movement of the "reset" key 38, rocks the plate 201 counter-clockwise about the shaft 75 to disengage the totalizer from the actuator, allowing the totalizer wheels to stand in their zero positions.

As the plate 201 moves counter-clockwise to its normal position, a stud 332, projecting laterally therefrom, contacts with the upwardly extending tail of the pawl 329, rocking this pawl counter-clockwise about its pivot 292 and freeing the nose of this pawl from the stud 331, thereby freeing the plate 204 to the actuator 205, which now restores this plate clockwise to its normal position.

As explained above, during "read" operations the pawl 234 moves behind the stud 228 (Fig. 4) to temporarily maintain the totalizer engaging plate 201 in its moved position, to hold the totalizer engaged with its actuators until the amount taken therefrom is again added onto the totalizer. But, during "reset" operations, it is necessary that the engaging plate 201 returns to normal to disengage the totalizer before the actuators 112 return to normal, to prevent reentry of the amounts into the totalizer. Therefore, during "reset" operations the pawl 234 must be held in its normal and ineffective position. To obtain this end, a stud 334 is mounted on a curved extension of the plate 288, to hold the pawl 234 ineffective during "reset" operations. When the plate 288 is rocked clockwise by the "reset" key 38, the stud 334 contacts the arm 237 of the pawl 234, and holds the pawl 234 in its ineffective position, until near the end of the "reset" operation, when the plate 288 is returned by the "reset" key.

Transaction counters

The machine of the parent patent is provided with a plurality of special counters, one associated with each of the transaction keys 36, to count the number of times the machine is operated under the control of the transaction key. These counters are selected by the particular transaction key 36 associated therewith and only one special counter is actuated at each operation.

The segment gear 182 (Fig. 2) differentially set by the differential cam slot 179 in the transaction key 36, meshes with a pinion 337 fast on a shaft 274 supported in the side frame 48 and 49 of the machine. A plurality of selecting disks 339, 340, 341, 342 and 343 are secured to, and spaced at different intervals on, the shaft 274. An elongated slot 345 in a pitman 344 surrounds the shaft 274, and a curved slot 346 in the pitman 344 embraces a stud 347 projecting from an arm 350 secured to the key coupler shaft 56. A slot 348 in the other end of the pitman 344 embraces a stud 349 in a counter operating lever 351, journaled on a counter shaft 356.

The counter operating lever 351 carries a tined pawl 358 cooperating with ratchets secured to the sides of counter wheels 353. Each of the levers 351 is provided with an ear 364 extending laterally into the plane of its disk on the shaft 274. Likewise each of the pitman 344 carries a pin 365 projecting laterally across the plane of its respective disk.

It will be remembered that the desired transaction key 36 must be depressed before the machine may be operated and especially before an amount key may be depressed. Depression of one of the transaction keys 36 differentially rotates the setting segment 182 and the counter selecting shaft 274 according to the particular key 36 depressed. This brings the particular selecting disk 339, 340, 341, 342 or 343, depending on which key 36 was depressed, opposite the stud 365 in its corresponding pitman 344.

Depression of a transaction key 36 does not rock the key coupler shaft 56 since its key coupler 71 is not fast on this shaft. The sequence of operation is then to first depress the desired transaction key 36 rotating the shaft 274 to select the corresponding counter, and then depress the desired amount keys 35 to add onto the totalizer, either the "read" key 37 or the "reset" key 38 may be depressed to read or reset the selected totalizers. Operation of any amount key 35, the "read" key 37 or the "reset" key 38, rocks the key coupler shaft 56, to operate the selected special counters.

The key coupler shaft 56 rocks the arm 350 first counter-clockwise, and then clockwise to normal at each operation of the machine to operate the pitmen 344. When the pitmen 344 are operated, the stud 365, on the particular pitman associated with the selected counter, encounters the periphery of its disk, and continued movement of the arm 350, by the stud 347, rocks the pitman 344 counter-clockwise about the shaft 274 as a fulcrum. This movement by the slot 348 and stud 349 rocks the lever 351 clockwise to advance the counter wheel 353 of the selected counter one step of movement.

The clockwise movement of the arm 350 restores the pitman to its normal position and retracts the pawl 358. However, upon operation of the pitmen 344, the ears 364, projecting from the remaining levers 351, encounter the periphery of their disks. The continued movement of the remaining arms 350 rocks the pitmen counter-clockwise about the studs 349 as pivots, the slots 345 in the opposite ends of the pitmen moving idly over the shaft 274, in which case the counter wheels 353 are not operated.

Indicators

Indicators are provided to indicate toward the front and toward the rear of the machine, the amounts entered into the machine, the total and sub-totals taken from the totalizers. These indicators include amount targets 370 (Fig. 1), supported in holders 371 carried between pairs of arms 372, pivoted on the shaft 158. Each of the holders 371, associated with the groups of amount keys 35, carries ten targets 370, arranged one behind the other and having loops 373 formed at their tops.

Notches (not shown) adapted to cooperate with these loops are formed in a lifter bar 376 extending laterally across the machine at the top of the indicators. The arms 372 are differentially positioned to bring the particular indicator target 370, depending upon the particular key depressed, into alinement with the lifter bar 376 which raises and lowers the indicators thus selected. Each of the pairs of arms 372 is differentially positioned by the gear segment 112 and the plate 113 associated therewith. The segment 112 and plate 113 are each provided with an arcuate slot 377 embracing a roller 378 on a link 379 pivoted at 380 to an arm 381, pivoted on a rod 382 and secured, by a hub 384, to a gear segment 383. The gear segment 383 meshes with a rack 385 secured to one of the pair of arms 372.

The rack 385 is provided with a flange 386 having ten notches 387 therein, with which a downwardly extending projection (not shown) on the lifter bar 376 cooperates to aline the indicator holder in its selected position.

The bar 376, provided to raise and lower the indicators selected, is supported at each end in a channel bar 395 (Fig. 6) (only one being shown) guided in its vertical movement by two studs 396 projecting laterally from each side frame of the machine. To allow for a swinging motion, the channel bars 395 are pivoted on studs 397, carried by arms 398 (only one being shown) secured on a shaft 399 extending between the side frames 48 and 49 of the machine.

At the proper time during the operation of the machine, the shaft 399 is rocked to lower the indicator last displayed, and then to raise the newly selected indicator to a position where it may be seen through sight opening 400 and 401 (Fig. 2) in the cabinet 43.

To operate the shaft 399 and the arms 398 to raise and lower the indicators, a pair of arms 402 and 403 (Fig. 6) are secured to the key coupler 72 by a stud 404, and rocked therewith at each operation of the machine, first counter-clockwise, and then clockwise to normal. A cam arm 405, pivoted on the shaft 56, interjacent the arms 402 and 403, carries two hooked pawls 406 and 407, adapted alternately to cooperate with arms 402 and 403 to actuate the cam arm 405. The cam arm 405 is provided with a cam slot 408, embracing a roller 409 on an arm 410 secured to the shaft 399. As the key coupler 72, under the influence of the depressed keys rocks counter-clockwise, the arm 403, being in engagement with the hooked pawl 406, carries this pawl, and with it, the cam arm 405 also counter-clockwise to position the right-hand end of the cam slot 408 about the roller 414, rocking the arm 410, shaft 399 and arm 398 clockwise to lower the indicators.

Figure 6:
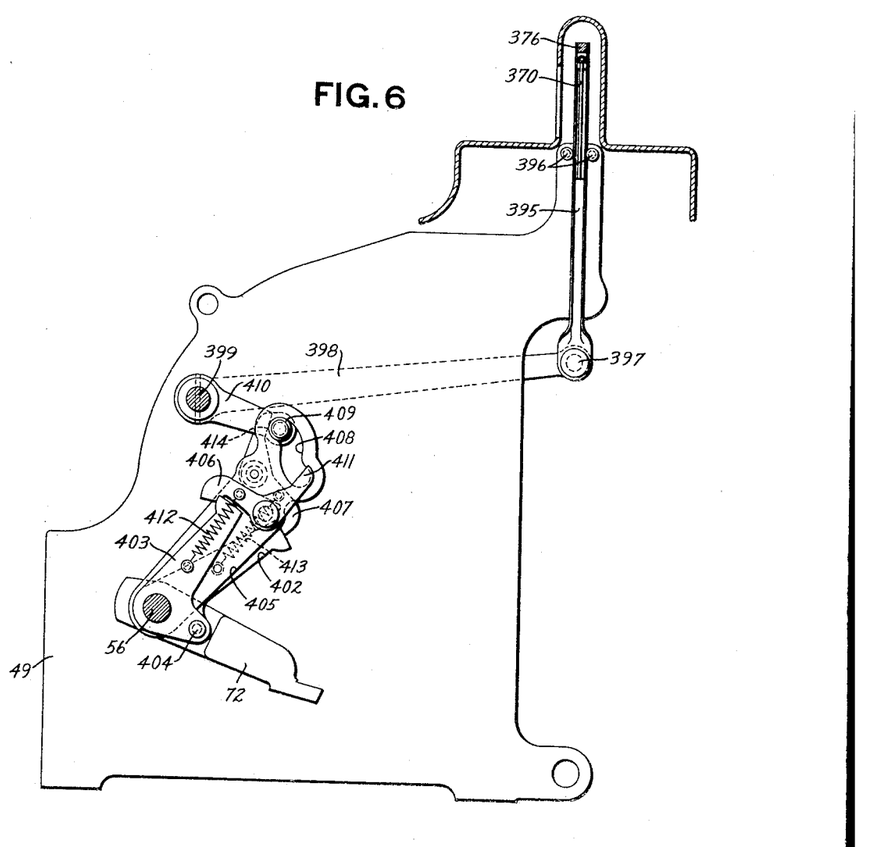
Fig. 6 shows the indicator lifting mechanism.

As the right-hand end of the cam slot 408 approaches the stud 414, the upwardly extending arm 411 of the pawl 406 strikes the roller 414, rocking the pawl clockwise about its pivot on the cam arm 405, and disengaging said pawl 406 from the arm 403 to permit the arm 403 to continue and complete its rocking movement.

The key coupler 72 and the arms 402 and 403 continue their counter-clockwise travel, the end of the arm 403 riding under the nose of the pawl 406.

As the arm 402 passes the nose of the pawl 407, a spring 413 rocks the pawl 407 into the path of the end of the arm 402 so that when the key coupler and the shaft 56 commence their clockwise travel, the arm 402 picks up the pawl 407, and with it, the cam arm 405, rocking these parts clockwise as a unit. When the pawl 407 rocks clockwise under the influence of its spring 413 an upwardly extending arm 414 thereon is projected into the path of the roller 409, and, as the cam arm 408 approaches the limit of its clockwise travel the upwardly extending projection of the pawl 407 strikes the roller thereby rocking the pawl 407 counter-clockwise to disengage it from its drive arm 402.

The clockwise movement of the cam arm 405 rocks the arm 410, shaft 399 and arm 398 counter-clockwise to raise the selected indicators, as above described.

After the pawl 407 is disengaged from its drive arm 402, the arms 402 and 403, together with the shaft 56 and key coupler 72 continue their clockwise travel to normal position, the nose of the pawl 407 resting on the arcuate end of the arm 402. At the very end of the clockwise travel of the arm 403, the spring 412 snaps the hook 406 into engagement with the nose of the arm in readiness for the next operation.

There are only five indicators in the transaction group selected under the control of the transaction keys 36. These indicators 421 (Fig. 2) are carried in a holder similar to the holder just described for the amount indicators, and are similarly selected. A segment 422, fast on the shaft 420 extending between machine side frames meshes with a rack secured to the side of the indicator holder. A link 424 connects a downwardly extending arm 423, also secured to the shaft 420, to the differentially movable segment 182. It is obvious that the differential movement of the segment 182, due to the engagement of the differential slot 179 in the enlarged rear end of the transaction keys 36, with the stud 180 on the arm 181, is transmitted by the link 424, arm 423 and shaft 420 to the segment 422 to differentially position the indicator holder carrying the indicators 421 for the transaction keys. These indicators are raised and lowered in exactly the same manner as was described for the amount indicators.

The "read" key 37 and the "reset" key 38 control indicators 425 and 426 (Fig. 4) and a blank indicator 427 which is displayed during the item entering operation. These indicators are carried in a holder supported on two arms 429 pivoted on the shaft 158, similar to the other indicator arms.

The indicators 425, 426 and 427 are selected in a manner similar to that in which the indicators for the amount banks are selected. A segmental arm 430 of a lever, journaled on the shaft 382 meshes with a rack 428, secured to the side of the "read" and "reset" indicator holder. A link 432 connects the other arm 431 of the lever to a differential mechanism (not shown) set under the control of the "read" key 37 and the "reset" key 38, to differentially position the indicators 425, 426 and 427 according to the key 37 or 38 depressed. These indicators are also raised and lowered by the same mechanism employed to raise and lower the indicators for the amount banks and transaction banks.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of lever keys having a normal position and an operated position, a pivoted member having a normal position and an operated position adapted to be operated by one of said keys, means for connecting said pivoted member and said key during their operation, means for retaining said pivoted member and said key in operated position, a second pivoted member adapted to be operated independently of said first pivoted member by another one of said keys, means cooperating with said second pivoted member for disabling said retaining means, and means operated by said second pivoted member adapted to engage said first pivoted member in its operated position and return said first pivoted member to its normal position.

2. In a machine of the class described, the combination of a plurality of lever keys having a normal position and an operated position, a pivoted member having a normal position and an operated position adapted to be operated by one of said keys, means for connecting said pivoted member and said key during their operation, means for retaining said pivoted member and said key in operated position, a second pivoted member adapted to be operated independently of said first pivoted member by another one of said keys, means cooperating with said second pivoted member for disabling said retaining means, and means operated by said second pivoted member adapted to engage said first pivoted member in its operated position and return said first pivoted member to its normal position in unison with said second pivoted member.

3. In a machine of the class described, the combination of a plurality of lever keys having a normal position and an operated position, a pivoted member having a normal position and an operated position adapted to be operated by one of said keys, means for connecting said pivoted member and said key during their operation, means for retaining said pivoted member and said key in operated position, a second pivoted member adapted to be operated independently of said first pivoted member by another one of said keys, means cooperating with said second pivoted member for disabling said retaining means, and means intermediate of said first pivoted member and said second pivoted member for connecting said pivoted members together in their operated position to cause said pivoted members to return to normal position in unison.

4. In a machine of the class described, the combination of a plurality of lever keys having a normal position and an operated position, a pivoted member having a normal position and an operated position adapted to be operated by one of said keys, means for connecting said pivoted member and said key during their operation, means for retaining said pivoted member and said key in operated position, a second pivoted member adapted to be operated independently of said first pivoted member by another one of said keys, means cooperating with said second pivoted member for disabling said retaining means, and means for coupling said pivoted members together in their operated position.

5. In a machine of the class described, the combination of a plurality of groups of lever keys, a plurality of pivoted members adapted to be operated by said groups of keys, means for retaining one of said pivoted members and its operating key in operated position, means carried by a second pivoted member for connecting both pivoted members together when the second pivoted member is moved to the retained position of the first pivoted member, and means operated by the second pivoted member for disabling said retaining means to permit both pivoted members to return to normal position in unison.

6. In a machine of the class described, the combination of transaction keys, amount keys, a transaction key coupler having a home position and an operated position, an amount key coupler having a home position and an operated position adapted to move from the home position to the operated position independently of the transaction key coupler, and means for automatically coupling said amount key coupler with said transaction key coupler in their operated positions to cause said couplers to return to home position in unison.

7. In a machine of the class described, the combination of amount keys, transaction keys adapted to be operated prior to the operation of said amount keys, a transaction key coupler having a home position and an operated position, means for retaining said transaction key coupler in operated position, means operated by said amount key coupler for disabling said retaining means, and means for coupling said amount key coupler with said transaction key coupler in their operated positions to cause said couplers to return to home position in unison.

8. In a machine of the class described, the combination of transaction keys, amount keys, a transaction key coupler having a home position and an operated position, an amount key coupler having a home position and an operated position, means for locking said amount key coupler in home position, means operated by said transaction key coupler for disabling said locking means, means for locking said transaction key coupler in operated position, means operated by said amount key coupler for disabling said transaction key coupler locking means, and means for coupling said key couplers together in their operated positions so that they will return to home positions in unison.

9. In a machine of the class described, the combination of amount keys, transaction keys, an amount key coupler, a member pivoted coaxially with the key coupler, means for normally locking said amount key coupler against operation, and means operated by said pivoted member upon depression of a transaction key for disabling said locking means.

10. In a machine of the class described, the combination of two sets of keys, a key coupler for one set of keys, a member pivoted coaxially with the key coupler and associated with the other set of keys, a pivoted arm normally in the path of the key coupler for preventing operation of said key coupler and its cooperating keys, and means connected to said arm actuated by said pivoted member upon depression of any one of its associated set of keys for moving said arm into non-functioning position to release the key coupler and its cooperating keys.

11. In a machine of the class described, the combination of two sets of keys, a key coupler for one set of keys, a member cooperating with and adapted to be actuated by any one of the other set of keys, an arm adapted to swing under said key coupler in the position it occupies after a complete depression of its cooperating keys, and means operated by said member upon depression of any of its cooperating keys for moving said arm out of functioning position.

12. In a machine of the class described, the combination of two sets of keys, a key coupler for one set of keys, a member cooperating with and adapted to be actuated by any one of the other set of keys, an arm adapted to swing under said key coupler in the position it occupies after a complete depression of its cooperating keys, a second arm adapted to be rocked upon movement of said member, and means connecting said arms to move the first mentioned arm out of functioning position upon rocking movement of said second mentioned arm.

13. In a machine of the class described, the combination of two sets of keys, a key coupler for each set of keys, a lug on one end of one of said key couplers, a latch plate slidably supported on one end of the other of said key couplers, means for moving said latch plate into latching position at the end of the upward movement of its supporting key coupler, and means for moving said latch plate out of functioning position as its supporting key coupler moves into home position.

14. In a machine of the class described, the combination of two sets of keys, a key coupler for each set of keys, a lug on the end of one of said key couplers, a slidably mounted latch plate on the end of the other of said key couplers provided with an arcuate slot terminating in a laterally extending portion defining a shoulder, means normally controlling said latch plate to cause said lug to move in said arcuate slot upon forward movement of its supporting key coupler, and means operable upon completion of the forward movement of said key coupler to cause the latch plate to engage its shoulder with said lug.

15. In a machine of the class described, the combination of a plurality of groups of lever keys, a plurality of key couplers adapted to be operated by said lever keys, a plurality of groups of indicators, means operated by each group of keys for selecting an indicator appropriate to the key operated, and means operated by one of said key couplers for raising and lowering said selected indicators.

In testimony whereof I affix my signature.

JOHN P. FRANK.